United States Patent
Han

(10) Patent No.: US 7,356,002 B2
(45) Date of Patent: Apr. 8, 2008

(54) METHOD FOR RESERVING A NEW CARE OF ADDRESS (COA) IN ADVANCE TO ACHIEVE A FAST HANDOVER UNDER A MOBILE INTERNET PROTOCOL VERSION 6 (IPV6) ENVIRONMENT

(75) Inventor: Youn-hee Han, Guri-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 639 days.

(21) Appl. No.: 10/832,238

(22) Filed: Apr. 27, 2004

(65) Prior Publication Data

US 2004/0218566 A1 Nov. 4, 2004

(30) Foreign Application Priority Data

Apr. 29, 2003 (KR) .................. 10-2003-0027312

(51) Int. Cl.
  *H04Q 7/00* (2006.01)
(52) U.S. Cl. .................. 370/331; 370/328; 370/338; 370/475
(58) Field of Classification Search ............... 370/312, 370/313, 342, 328, 331, 338
See application file for complete search history.

(56) References Cited

U.S. PATENT DOCUMENTS

| 7,075,910 | B2 * | 7/2006 | Chen et al. | .................. 370/331 |
| 7,123,598 | B1 * | 10/2006 | Chaskar | .................. 370/331 |
| 2002/0126642 | A1 * | 9/2002 | Shitama | .................. 370/338 |
| 2003/0026230 | A1 | 2/2003 | Ibanez et al. | |

FOREIGN PATENT DOCUMENTS

WO  WO 99/41925 A1  8/1999

OTHER PUBLICATIONS

G. Dommety, et al., "Fast Handovers for Mobile IP-V6" IETF Standard -Working-Draft, Internet Engineering Task Force, IETF, CH, vol. mobileip, No. 3, Jul 2001, XP015023337.
Dirk Trossen et al., "A dynamic protocol for candidate access-router discovery", Internet Draft, Mar. 14, 2003, pp. 1-49, XP002904961.

* cited by examiner

Primary Examiner—Rafael Perez-Gutierrez
Assistant Examiner—Abdias Mondesir
(74) Attorney, Agent, or Firm—Sughrue Mion, PLLC

(57) ABSTRACT

A method is provided for reserving a new CoA in advance for a mobile node. The method for reserving the new CoA includes transmitting to the router a CoA reservation solicitation message including a link layer address of the mobile node from the mobile node; transmitting to the adjacent router the CoA reservation solicitation message including the current CoA and the link layer address of the mobile node the from router; generating a new CoA from the adjacent router and performing a duplicate address check on the new CoA to establish the new CoA; and storing the established new CoA in a proxy table that is managed by the adjacent router to perform the proxy.

6 Claims, 5 Drawing Sheets

METHOD FOR RESERVING A NEW CARE OF ADDRESS (COA) IN ADVANCE TO ACHIEVE A FAST HANDOVER UNDER A MOBILE INTERNET PROTOCOL VERSION 6 (IPV6) ENVIRONMENT

CROSS-REFERENCE TO RELATED APPLICATIONS

This application claims the benefit of Korean Patent Application No. 2003-27312 filed Apr. 29, 2003, in the Korean Intellectual Property Office, the disclosure of which is incorporated herein by reference.

BACKGROUND

1. Field of the Invention

The present invention generally relates to a method for reserving a new CoA (New Care-of Address, hereinafter, to be referred to as "NCoA") to achieve a fast hand-off under a mobile IPv6 (Internet Protocol version 6) environment, and more particularly, a method for reserving a new CoA in advance to reduce the time necessary for generating a CoA and performing a fast hand-off by using the new CoA reserved in advance in another network before a mobile node linked to a foreign network is moved to another network.

2. Description of the Related Art

Recently, with the rapidly increasing use of the Internet, the development of radio communications technology, and the improvement of performance of mobile terminals such as a portable computer, PDA (Personal Digital Assistant), users using wireless Internet have increased. Under a wireless Internet environment, the mobile terminal occasionally changes its network connection site with the movement of its location occasionally. Such a mobile terminal is referred to as a mobile node.

In order for the mobile node to perform wireless Internet communication, even when the mobile node moves to a foreign network out of its home network, it is necessary that a high quality Internet service identical to that of the home network is assured. Even when the mobile node changes its network connection site, a variety of technologies have been proposed to provide a stable wireless Internet service. Of special note, the Internet Engineering Task Force (IETF), which is a mobile IP working group, has proposed a method by which all mobile terminals can continuously use a specific identifier, referred to as an IP address, regardless of the network connection site. This method defines a mobile IP protocol and complements defects, and allows tasks to be continued to be performed when the mobile device changes networks. Also, in order to overcome a problem that the existing IPv4 address system is not able to accept increasing address demands, the introduction of mobile IPv6 technology is underway to provide wireless internet service using the IPv6.

In accordance with the mobile IPv6 technology, even when a mobile node moves to a foreign network, the mobile node communicates with a correspondent node (CN) using its home address (HA) via a home agent (HA) which is a router having its registration information. When the mobile node is linked to the foreign network, the mobile node is assigned with a CoA (care of Address), which is a temporal address from an access router of the foreign network, and registers the assigned CoA along with the home address at the home agent, which is called a binding.

Accordingly, the home agent intercepts packets from the correspondent node to the mobile node, and forewords the packets to a mobile node located at the foreign network using a current CoA of the mobile node.

In order to be assigned a CoA, the mobile node makes a link layer connection to the foreign network, and then receives a router advertisement (RA) message from a router of the foreign network. To this end, the mobile node may multicast a router solicitation message to the overall network.

The router advertisement message provides prefix information of the network. Accordingly, the mobile node generates a new CoA using the prefix information of the network and its link layer address (LLA). The mobile node sets the generated CoA as a temporal address.

When it is not possible to determine if the CoA is generated according to the movement of the mobile node to the network or the re-setting-of the network interface of the mobile node, delay should be carried out for a time between 0 and 1 second.

Then, the mobile node multicasts a neighbor solicitation message including its link layer address to the newly linked network, and starts duplicate address detection (hereinafter, to be referred to as "DAD").

If the neighbor advertisement informing the duplicate address is not received by the mobile node within a predetermined time limit (RetransTimer), the corresponding CoA is regarded as a unique CoA, and the mobile node performs the communication using this CoA in the network. The predetermined time limit is 1000 ms according to the default.

However, if any node has already used the corresponding CoA, the node transmits to the mobile node the neighbor advertisement including its link layer address as a response for the neighbor solicitation message. As a result of this, the mobile node randomly again generates an ID for a corresponding interface, again generates a new CoA, and again performs the DAD for the generated CoA. Even after continuously performing the DAD five times, if a unique CoA can not be established, the mobile node gives up the communication in the corresponding foreign network, and waits until the link is changed.

As described above, according to the conventional mobile IPv6 protocol, even if the DAD is successful, it takes, at least, as long as a specific time limit, and if the DAD has failed, it takes several times the time limit for the hand-off. Accordingly, during this period, the mobile node is not able to use the CoA that is set as the temporal address, and therefore, is not able to perform the binding. Thus, there is generated a great deal of packet losses during the hand-off.

SUMMARY

The present invention has been made in order to solve the foregoing problems described above. Accordingly, it is an objective of the present invention to provide a method for reserving a new CoA that, before a mobile node linked to a foreign network is moved to another network, is capable of reducing the time necessary for generating a CoA and performing a fast hand-off by reserving a new CoA in advance in another network under a mobile IPv6 environment.

In order to achieve the object of the present invention, under a mobile IPv6 environment, in a network including a mobile node, a router linked to the mobile node and communicating using a current CoA, and a plurality of routers geographically adjacent to the router, there is provided a method for reserving a new CoA for the mobile node in advance in the adjacent routers. The method for reserving a new CoA according to the present invention comprises the steps of transmitting to the router a CoA reservation solicitation message including a link layer address of the mobile node from the mobile node; transmitting to the adjacent router a CoA reservation solicitation message including the current CoA and the link layer address of the mobile node from the router; generating a new CoA by the adjacent router and performing a duplicate address check on the new CoA to confirm the new CoA; and storing the established new CoA in a proxy table that is managed by the adjacent router to perform the proxy.

Preferably, the method for reserving a new CoA according to the present invention further comprises the steps of when the mobile node is newly linked to one adjacent router of the plurality of adjacent routers, transmitting the reserved CoA request message to the linked one adjacent router; retrieving the new CoA in a proxy table that is managed by the linked one adjacent router; removing the retrieved new CoA from the proxy table to suspend the proxy performance; transmitting the retrieved new CoA to the mobile node; and allowing the mobile node to communicate using the transmitted new CoA.

Preferably, the proxy table comprises at least one list including the current CoA, the link layer address, the new CoA and the time limit for the new CoA.

Preferably, the new CoA retrieving step compares the current CoA of each of the list in the proxy table with the current CoA included in the reserved CoA request message to retrieve a new CoA included in the list in which the same current CoA is present.

Preferably, the reserved CoA request message is transmitted in the router solicitation message.

It is desirable that the new CoA is transmitted in a router advertisement message.

It is desirable that the mobile communication environment includes mobile IPv6.

BRIEF DESCRIPTION OF THE DRAWINGS

The embodiments of the present invention will be explained with reference to the accompanying drawings, in which.

DETAILED DESCRIPTION OF THE INVENTION

The above objects, other objects, features and advantages of the present invention will be better understood from the following description taken in conjunction with the attached drawings.

Figure 1:
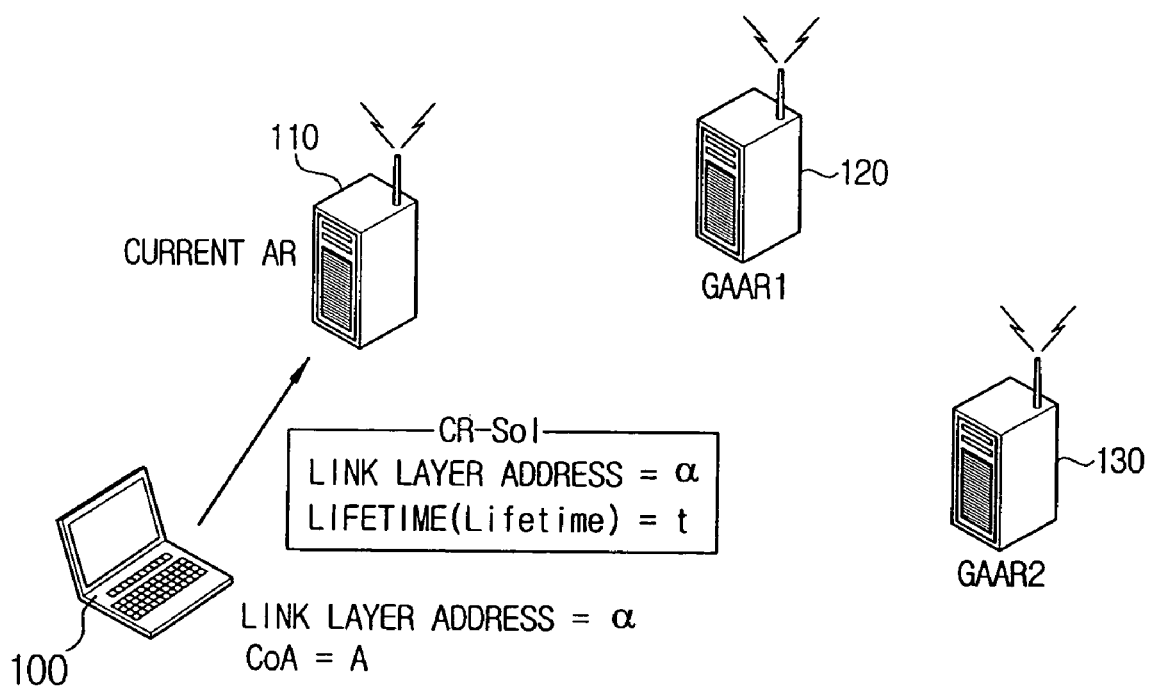
FIG. 1 is a view showing a wireless communication environment to which a new CoA reservation method according to the present invention can be applied.

FIG. 1 is a view showing a wireless communication environment to which a new CoA reservation method according to the present invention can be applied. With reference to FIG. 1, a mobile node 100 is linked to a router 110 in a network that is currently linked. The current linked router 110 is geographically adjacent to routers 120 and 130. Routers geographically adjacent to the current linked router 110 may include more than two routers, but, by an example, only two routers are shown herein.

If the mobile node 100 is connected to a foreign network, the mobile node 100 transmits a CoA reservation solicitation (CR-Sol) message to the current linked router 110. The CoA reservation solicitation message includes a link layer address and a lifetime, or time limit, for CoA reservation of the mobile node 100.

Figure 2:
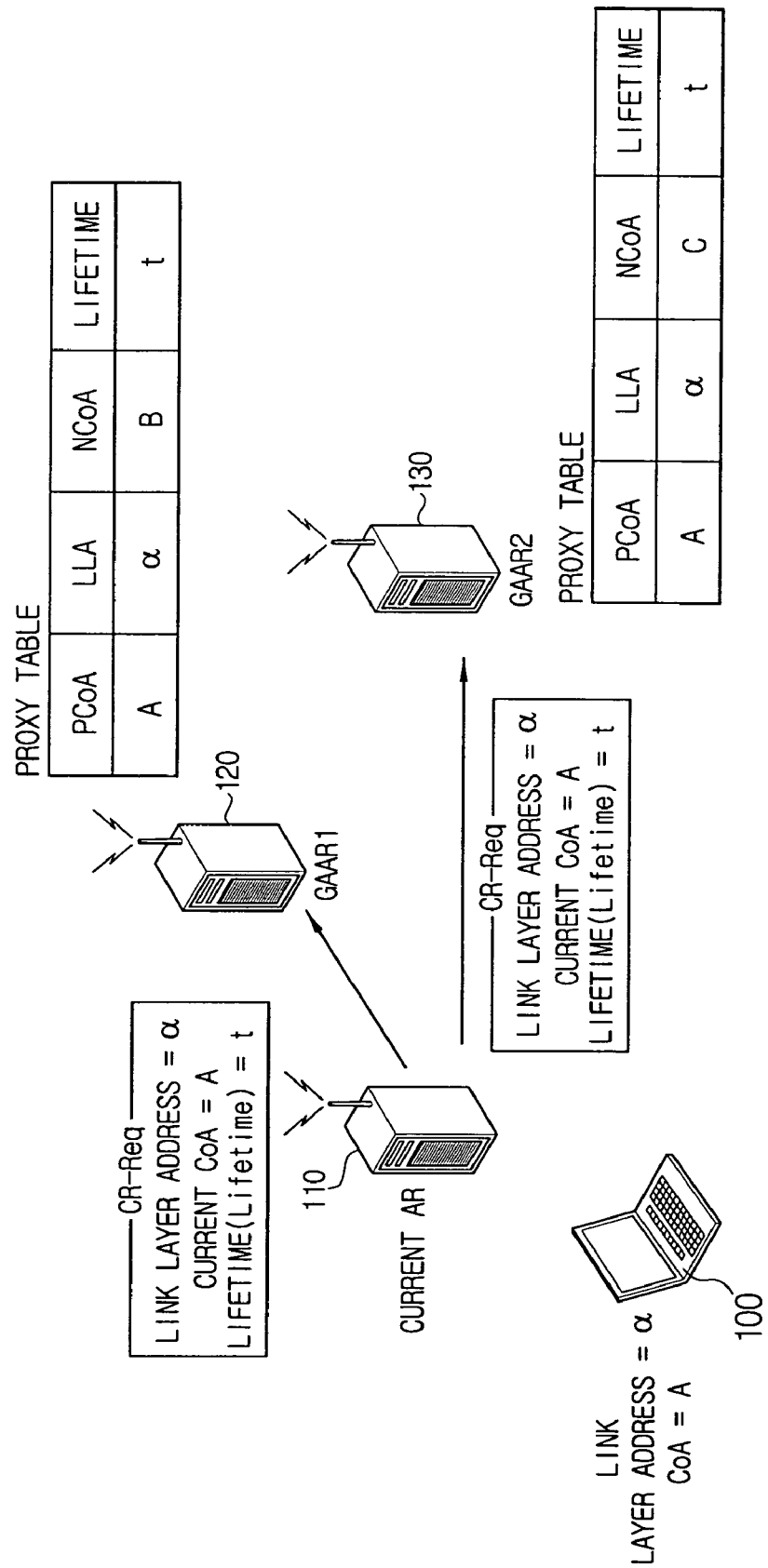
FIG. 2 is another view showing a wireless communication environment to which a new CoA reservation method according to the present invention can be applied.

FIG. 2 is another view showing a wireless communication environment to which a new CoA reservation method according to the present invention can be applied. With reference to FIG. 2, the current linked router 110 composes a CoA reservation request (CR_Req) message and transmits this message to the adjacent routers 120 and 130, the CoA reservation request message comprising the link layer address of the mobile node 100 and the current CoA and lifetime of the mobile node. Herein, the current CoA of the mobile node becomes a "previous" CoA (hereinafter, referred to as "PCoA") in a network to be linked after the movement of the mobile node.

Each of the adjacent routers 120 and 130 generates a new CoA using the link layer address of the mobile node 100 included in the CoA reservation request (CR_Req) message and each performs duplicate address detection (DAD) in a corresponding network.

When the adjacent routers 120 and 130 compose a unique New Care-of Address (NcoA) by performing the DAD, the adjacent routers 120 and 130 store a PCoA, link layer address, NCoA, and lifetime of the mobile node 100 as a list in a proxy table that each of the adjacent routers 120 and 130 manages, and start the proxy performance for a corresponding NcoA. Here, as described above, the PCoA is the current CoA of the mobile node. When one of the adjacent routers 120 and 130 does not compose a unique NcoA by performing the DAD, that one of the adjacent routers 120 and 130 does not store the list in the proxy table, and does not perform the proxy accordingly.

Figure 3:
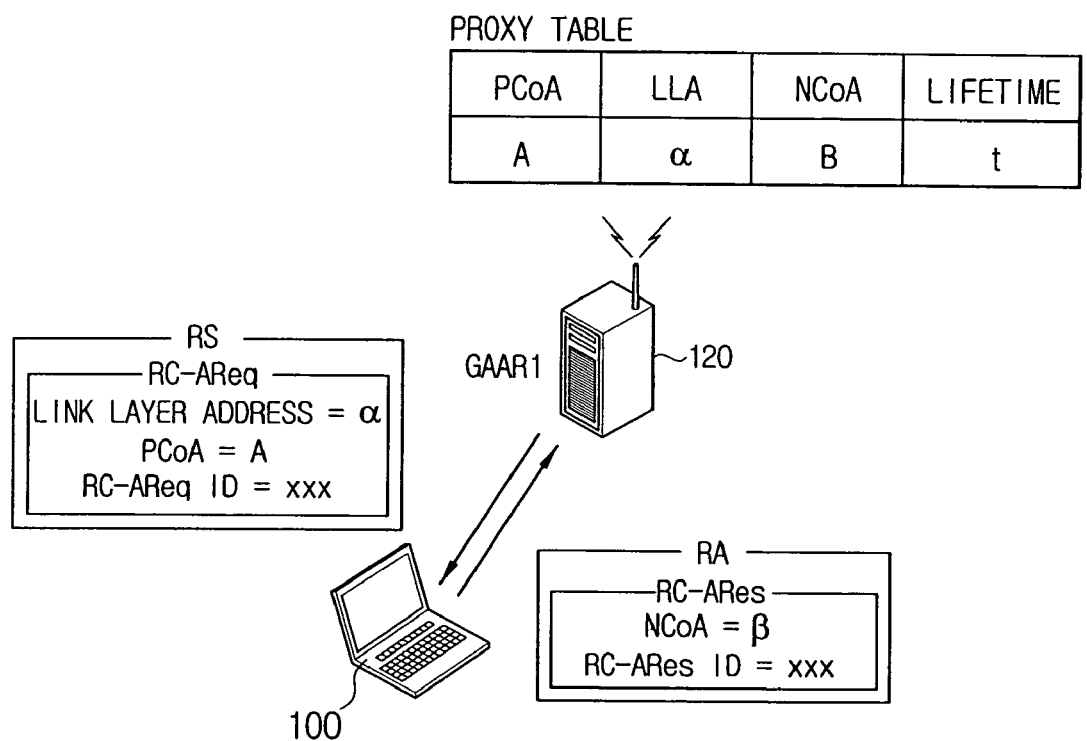
FIG. 3 is another view showing a wireless communication environment to which a new CoA reservation method according to the present invention can be applied.

FIG. 3 is another view showing a wireless communication environment to which a new CoA reservation method according to the present invention can be applied.

The mobile node 100 moves to another network and is linked to the adjacent router 120. The mobile node 100 transmits to the linked router 120 the router solicitation (RS) message additionally including a reserved CoA request (RC-AReq) message. The reserved CoA request message comprises a PCoA, which is a CoA in a network that has been just previously linked, the link layer address of the mobile node 100, and a reserved CoA request ID (RC-AReq ID). The reserved CoA request (RC-AReq) ID is to identify the reserved CoA request (RC-AReq) message transmitted by the mobile node 100. The adjacent router 120 that is currently linked and receives the message compares the PCoA included in the reserved CoA request (RC-AReq) message with PCoA stored in the proxy table that the adjacent router 120 manages, and as a result of the comparison, if there is a corresponding list, the adjacent router 120 suspends the proxy performance for NCoA of the corresponding list and removes the corresponding list from the proxy table.

Then, the current linked router 120 composes a reserved CoA response (RC_ARes) message, and transmits to the mobile node 100 the composed reserved message as being included in the router advertisement (RA) message. The reserved CoA response (RC_ARes) message includes a NCoA and a reserved CoA response ID (RC_ARes ID). The reserved CoA response ID (RC_ARes ID) is to identify the reserved CoA response (RC_ARes) message for the reserved CoA request (RC-AReq) message transmitted by the mobile node 100. Accordingly, the mobile node 100 immediately uses the NCoA included in the reserved CoA response (RC-ARes) message as its own new CoA, thereby performing the communication.

On the other hand, before the mobile node 100 moves to another network and is linked to the adjacent router 120, and when the DAD performance in the adjacent router 120 has failed and the proxy table has not been composed, the adjacent router 120 generates a new CoA according to the prior art after the movement of the network and performs the DAD.

Figure 4:
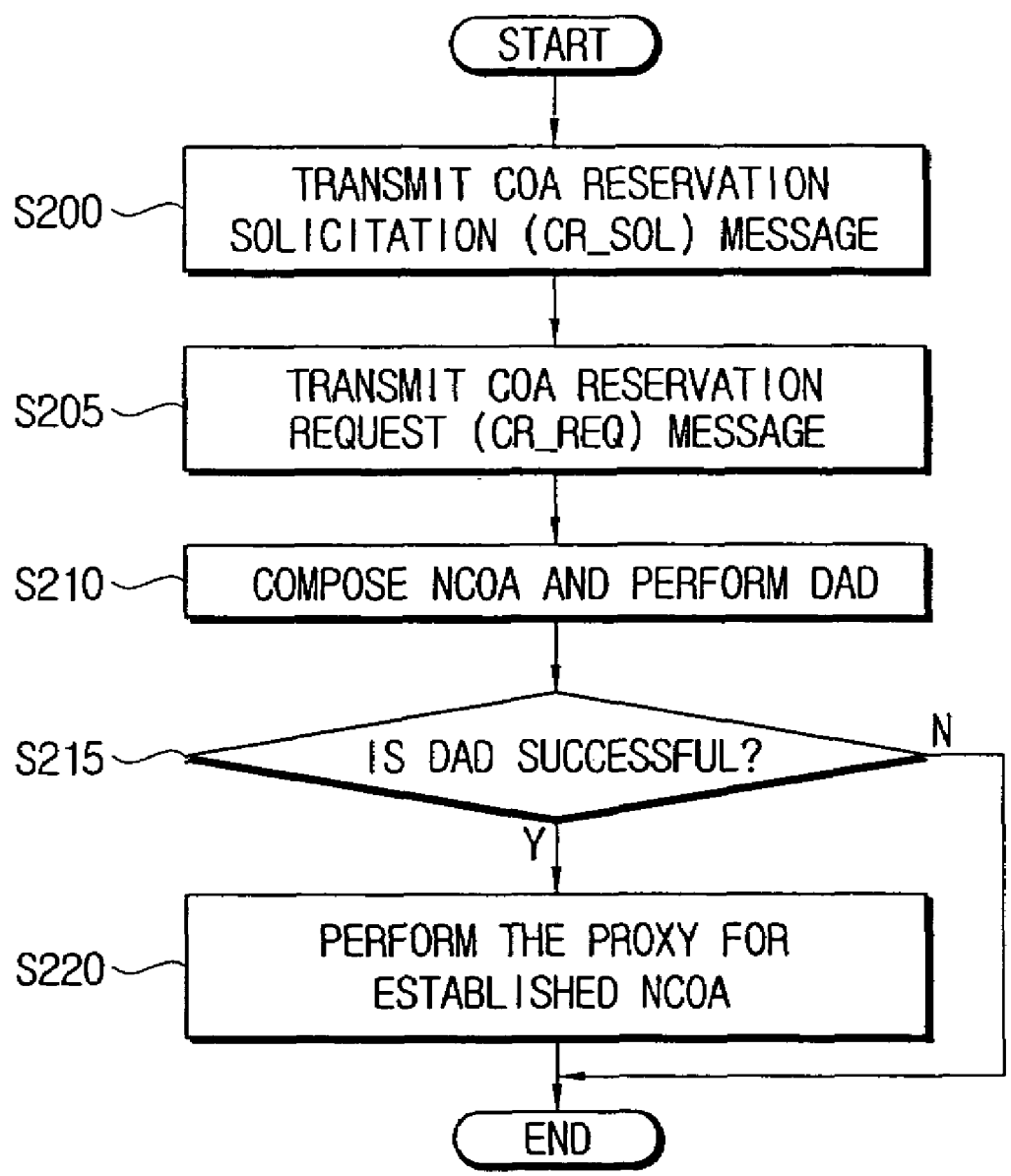
FIG. 4 is a flow chart describing a new CoA reservation method according to the present invention.

FIG. 4 is a flow chart describing a new CoA reservation method according to the present invention. The procedure of the new CoA reservation method will be simply described with reference to FIG. 4.

If the mobile node 100 is linked to a foreign network, the mobile node 100 transmits to current linked router 110 a CoA reservation solicitation (CR-Sol) message including the link layer address of the mobile node 100 (S200). The current linked router 110 transmits to the adjacent routers 120 and 130 a CoA reservation request (CR-Req) message including the link layer address of the mobile node 100 and the current CoA of the mobile node 100 (S205).

The adjacent routers 120 and 130 each generate a new CoA using the link layer address of the mobile node 100 and each perform a DAD in a corresponding network (S210). In the case where a unique new CoA is composed by performing the DAD ("Y" in S215), the adjacent routers 120 and 130 store PCoA, NCoA, etc, of the mobile node 100 as one list in the proxy table that the adjacent routers 120 and 130 manage, and start the proxy performance for a corresponding NCoA.

Figure 5:
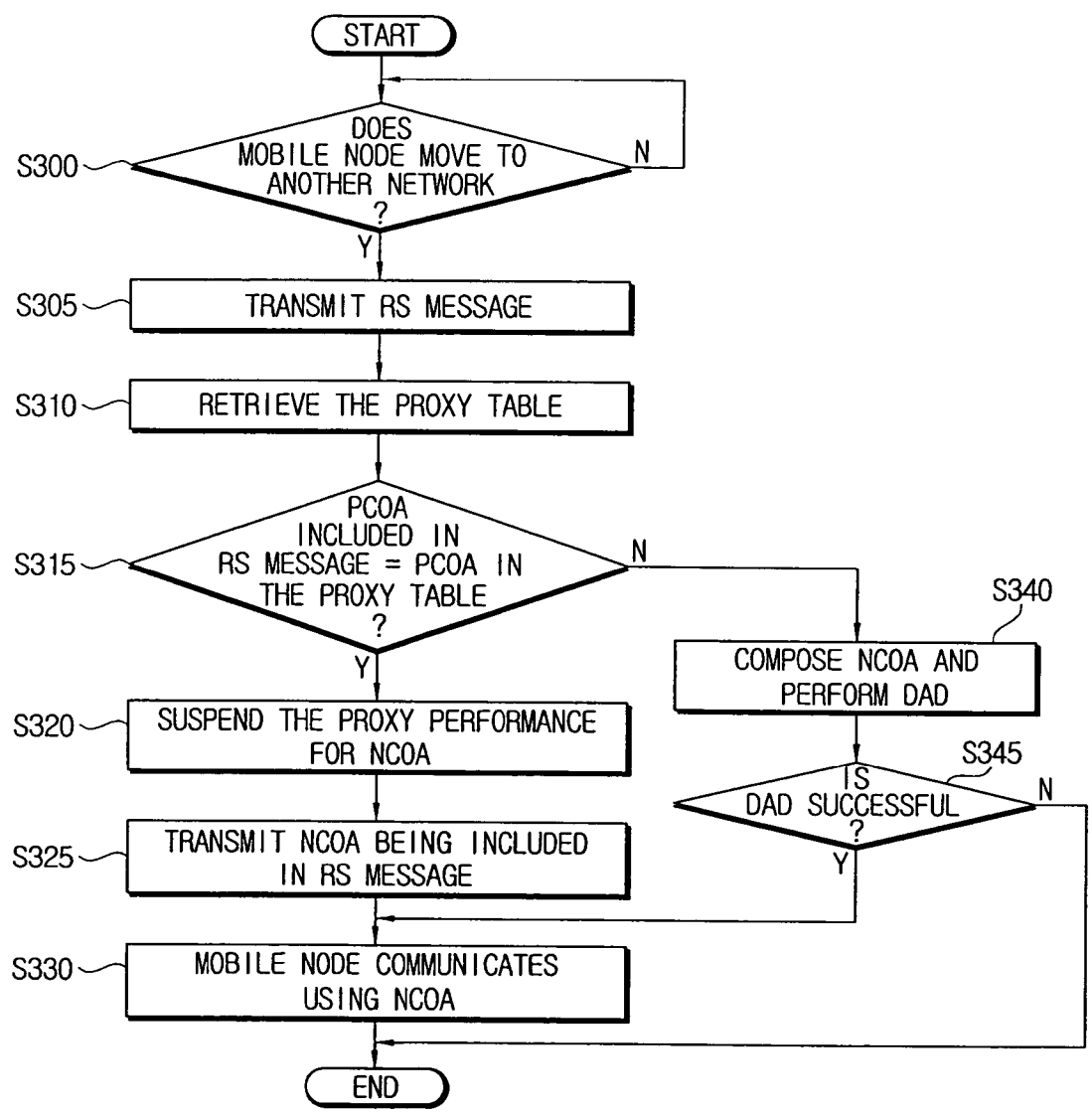
FIG. 5 is a flow chart describing a method for performing a communication by obtaining a reserved new CoA after the movement of a mobile node to an adjacent router.

FIG. 5 is a flow chart describing a method for performing the communication by acquiring a reserved new CoA after the movement of a mobile node to an adjacent router. The procedure wherein the mobile node acquires a new CoA according to the present invention and performs the communication will be simply described with reference to FIG. 5.

The mobile node 100 moves to another network and is linked to the adjacent router 120 (S300). The mobile node 100 sends to the linked adjacent router 120 the router solicitation (RS) message additionally including the reserved CoA request (RC-AReq) message (S305).

The linked adjacent router 120 compares a PCoA included in the reserved CoA request (RC-AReq) message with the PCoA stored in the proxy table that the router 120 manages (S310), and as a result of the comparison, if a corresponding list is present ("Y" in S315), the linked adjacent router 120 suspends the proxy performance for the NCoA of the corresponding list and removes the corresponding list from the proxy table (S320). Subsequently, the linked adjacent router 120 sends to the mobile node 100 the router advertisement (RA) message including the reserved CoA response (RC_ARes) message. The mobile node 100 carries out the communication by using a NCoA included in the reserved CoA response (RC_ARes) message as its own new CoA (S330).

If there is no PCoA corresponding to the PCoA included in the reserved CoA request (RC_AReq) message of the linked adjacent router 120 in the proxy table ("N" in S315), the linked adjacent router 120, after the movement of the mobile node to the network, generates a new CoA according to the related art and carries out the DAD (S340). As a consequence, as described above, if the DAD is successful ("Y" in S345), the mobile node 100 is able to communicate using the new CoA, however, if the DAD is failed ("N" in S345), the mobile node 100 is not able to communicate within the link.

In accordance with the present invention, before the movement of the mobile node to another network, by reserving a new CoA in advance for the router of the network adjacent to the network that is currently linked, that is to say, the adjacent router, and performing the proxy, the generated new CoA along with other information is stored in each of the proxy table as a list, thereby performing the proxy for the new CoA. After the movement of the mobile node 100 to the adjacent network, the mobile node 100 acquires a new CoA that is reserved in advance from a linked adjacent router, and immediately communicates using the acquired new CoA. Accordingly, after changing in the link, it is possible to reduce the time necessary for generating a new CoA, especially, the time of performing the DAD, and therefore, it is possible to achieve a fast hand-off and prevent packet loss accordingly.

Although the technical spirit of the present invention has been disclosed with reference to the appended drawings and exemplary embodiments of the present invention corresponding to the drawings have been described, descriptions in the present specification are only for illustrative purpose, not for limiting the present invention.

Also, those who are skilled in the art will appreciate that various modifications, additions and substitutions are possible without departing from the scope and spirit of the present invention. Therefore, it should be understood that the present invention is limited only to the accompanying claims and the equivalents thereof, and includes the aforementioned modifications, additions and substitutions.

What is claimed is:

1. A method, in a network comprising a mobile node and a router linked to the mobile node, wherein communication is performed using a current care of address (CoA), and a plurality of routers geographically adjacent to the router, for reserving a new CoA in advance for the mobile node under a mobile environment, said method comprising:

transmitting to the router a CoA reservation solicitation message including a link layer address of the mobile node, from the mobile node;

transmitting to a first adjacent router of the plurality of adjacent routers the CoA reservation solicitation message including the current CoA and the link layer address of the mobile node, from the router;

generating a new CoA by the first adjacent router and performing a duplicate address check on the new CoA to confirm the new CoA;

storing the established new CoA in a proxy table that is managed by the first adjacent router to perform a proxy;

if the mobile node is newly linked to the first adjacent router of the plurality of adjacent routers, transmitting a reserved CoA request message to the newly linked first adjacent router;

retrieving the new CoA in a proxy table that is managed by the newly linked first adjacent router;

removing the retrieved new CoA from the proxy table to suspend the proxy performance;

transmitting the retrieved new CoA to the mobile node; and allowing the mobile node to communicate using the transmitted new CoA.

2. The method of claim 1, wherein the proxy table comprises at least one list including the current CoA, the link layer address, the new CoA and a lifetime of the new CoA.

3. The method of claim 2, wherein the new CoA retrieving step compares a current CoA of each of said at least one list in the proxy table with the current CoA included in the reserved CoA request message to retrieve a new CoA included in at least one of each of said at least one list in which the same current CoA is present.

4. The method of claim 1, wherein the reserved CoA request message is transmitted in a router solicitation message.

5. The method of claim 1, wherein the new CoA is transmitted in a router advertisement message.

6. The method of claim 1, wherein the mobile communication enviromnent includes mobile Internet Protocol Version 6 (IPv6).

* * * * *